United States Patent [19]
Lowell

[11] 3,859,843
[45] Jan. 14, 1975

[54] APPARATUS FOR MEASURING SURFACES BY MERCURY INTRUSION
[76] Inventor: Seymour Lowell, 42 Wood Hollow Rd., Albertson, N.Y. 11501
[22] Filed: Nov. 10, 1972
[21] Appl. No.: 305,519

[52] U.S. Cl. .................................. 73/38, 73/432 R
[51] Int. Cl. .......................................... G01n 15/08
[58] Field of Search .............. 73/432 PS, 38, 432 R

[56] References Cited
UNITED STATES PATENTS
3,683,674  8/1972  Roy......................................... 73/38

Primary Examiner—Donald O. Woodiel
Assistant Examiner—Denis E. Corr
Attorney, Agent, or Firm—Bauer & Amer

[57] ABSTRACT

An apparatus for practicing the technique of mercury penetration or intrusion to determine the pore size distribution of a porous test sample which utilizes centrifugal force and, as a consequence, facilitates supervising the extent of said mercury intrusion under the prevailing conditions of pressure so that the pore size distribution is readily and effectively indicated by the apparatus.

1 Claim, 5 Drawing Figures

PATENTED JAN 14 1975    3,859,843
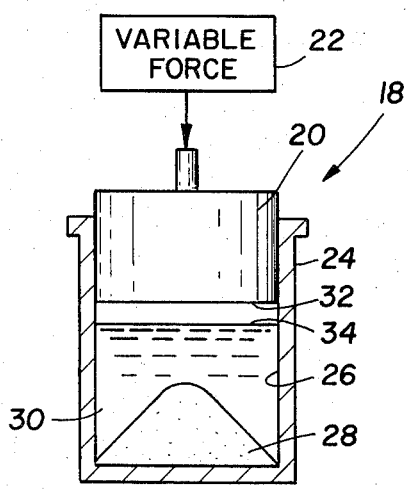
FIG.1a
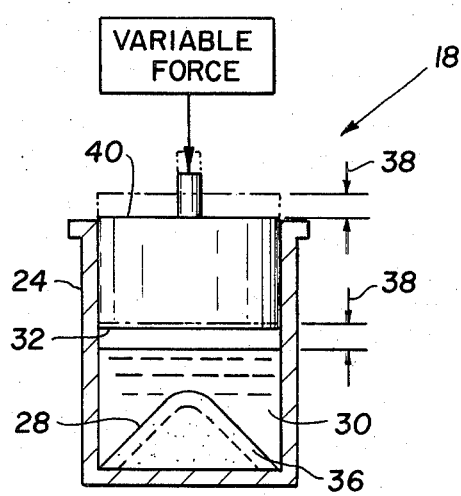
FIG.1b
PRIOR ART
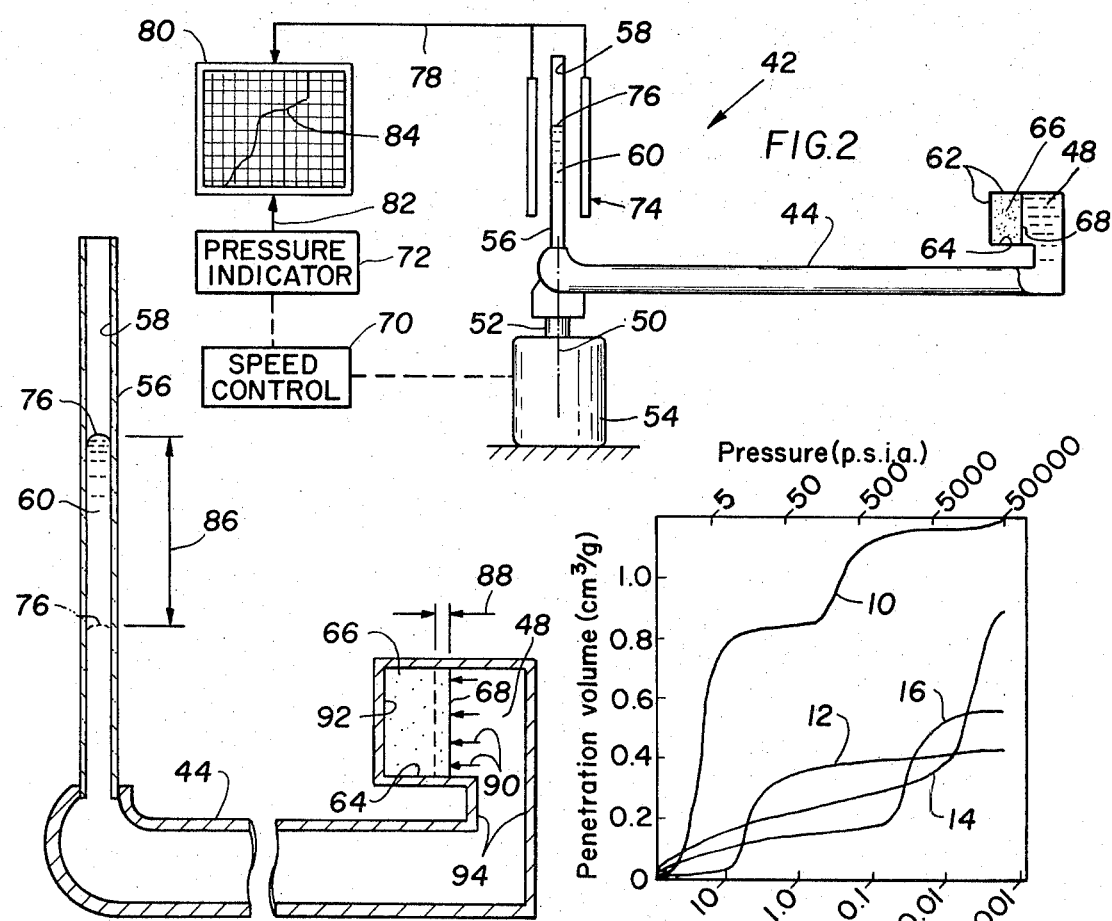
FIG.2
FIG.3
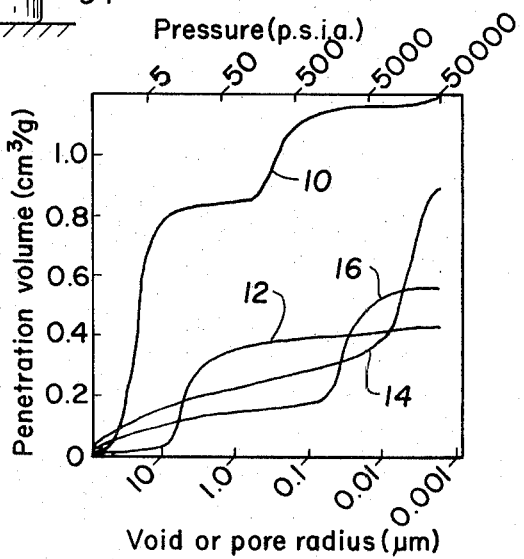
FIG.4

APPARATUS FOR MEASURING SURFACES BY MERCURY INTRUSION

The present invention relates generally to porous surface measurement and determination techniques and more particularly to an improved apparatus for supervising the intruding of mercury, or a similar non-wetting liquid, into a porous material so as to determine particle size distribution, the shape and structure of pores, and other characteristics of such material.

It is already well known how to determine the void spaces and pores in a porous material by use of mercury penetration or intrusion. Underlying this prior art technique is the recognition that the volume of mercury that will penetrate or intrude into the porous material is a function of pressure and that once obtaining this information, other characteristics, such as the particle size distribution and specific surface, can be determined. In addition, information regarding the shape and structure of pores can be obtained from the volume of mercury expelled from the pores as a function of decreasing pressure.

The improved apparatus of the present invention and also exemplary prior art apparatus thus both have in common some provision for forcing mercury, or other such non-wetting liquid, under various pressures into the pores of the material in question and into the void spaces among the particles thereof, it being understood and recognized that for each pressure the extent of the mercury penetration will be in proportion to the pore size. This is a consequence of the predictable force of opposition to the applied force that results from the surface tension of mercury (474 dynes per centimeter at 25°C.) which opposes the entrance of this fluid into a small opening. Thus, it is well known and well understod that as the pressure increases, the quantity of mercury forced into pores increases in proportion to the differential pore volume, the sizes of the pores corresponding to the instantaneous pressure. Thus, increasing the pressure on the material having a given pore size and/or void-space distribution, results in a unique pressure-volume relationship from which can be calculated the previously referred to characteristics of the surface, such as the surface area, the particle size distribution thereof, and also information about the shape and structure of the pores.

While, as indicated, there are available apparatus to achieve mercury penetration or intrusion for surface determination and measurement purposes, none of these provide said pressure-volume information in convenient form or display. For example, typically a small movement of a piston must be supervised in order to determine the extent of mercury volume intrusion, and such supervision is difficult and often done inaccurately.

Broadly, it is an object of the present invention to provide an improved porous surface measuring apparatus overcoming the foregoing and other shortcomings of the prior art. Specifically, it is an object to provide a measuring apparatus in the operation of which the applied mercury pressure and the corresponding mercury volume change it produces are both readily determined, recorded and displayed.

An apparatus for measuring porous surfaces by mercury intrusion which demonstrates objects and advantages of the present invention includes means for forcing the mercury into intruding relation with a porous test surface under centrifugal force or pressure, said mercury moving as a column in which only the end contacting the test surface is under the high pressure required for penetration of voids and pores and the other end is only under ambient pressure, and thus said other end is easily supervised by sensing or level-change detecting devices.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIGS. 1a and 1b are side elevational views illustrating a prior art apparatus for measuring surfaces by mercury intrusion;

FIG. 2 is a side elevational view, partly diagramatic, illustrating the improved measuring apparatus according to the present invention for practicing the technique of intruding mercury into a porous test surface to determine the characteristics of such surface;

Fig.3 is a side elevational view, on an enlarged scale, illustrating structural features of the rotatable member of the apparatus; and FIG. 4 illustrates the typical void and pore distribution of test samples using the mercury intrusion technique practiced by the apparatus hereof.

As already noted, increasing the pressure at which mercury is applied against a material having a given pore size and/or void-space distribution results in a unique pressure-volume relationship from which can be calculated certain characteristics of the surface, such as the surface area, the particle size distribution thereof, and also information about the shape and structure of the pores. To better understand the foregoing, reference should be made to the curves of FIG. 4. Curve 10 is a plot of typical data obtained from a powder having relatively coarse grains. Accordingly, curve 10 consists of two distinct parts, i.e., the part showing the volume of mercury penetrating the sample at pressures less than about 50 psia and which went into void spaces among the individual particles, and the part showing the volume of mercury above 50 psia which penetrate pores within the powder grains.

Curve 12 also represents a powder. Here, however, the particles are much finer than the particles of the sample of curve 10 and indicate that there were very few pores, but that the void spaces therein predominate.

Curve 14 represents a catalyst where the volume of pores exceed the volume of void spaces and in which there is a preponderance of pores in the 0.005 $\mu$m radius.

The final curve 16 illustrates how the pore size distribution can highlight unique structural characteristics of the test sample, which in this case was a mineral. The curve indicates that the mineral has pores, predominantly of about 0.04 $\mu$m in radius, but that there are fewer pores of about 0.01 $\mu$m radius.

The penetration technique, by which the curves of FIG. 4 were determined, can be practiced by any one of several prior art apparatus. Exemplifying this apparatus is that shown in FIGS. 1a, 1b. Such apparatus, generally designated 18, requires, first of all, a means of generating a pressure and a means of determining how much mercury the application of a given pressure forces into the pores or void spaces of the materials being tested. Thus, apparatus 18 includes a piston 20 operated by any appropriate means 22 of applying a selected pressure, such as a pump or the like. Piston 20 operates in a housing 24 which defines a piston chamber 26 and is made of a construction material, such as steel or the like, which is capable of withstanding the high pressures that will be generated and which, as shown in FIG. 4, might exceed 10,000 psia. As is generally understood, preparatory to the use of the apparatus 18, the powder sample or material 28 under examination is first dried and evacuated to remove adsorbed gases and vapors and is placed in the chamber 26, as is also a known volume of the intruding mercury 30. The pressure surface 32 of piston 20 is in actual contact with the upper level 34 of the body of mercury 30.

As illustrated in FIG. 1b, the functioning of apparatus 18 contemplates supplying a known force to the piston 20 which will result in its causing an extent of penetration 36 of the mercury 30 into the test sample 28 as a function of the pore size and void space distribution characteristics of the sample 28. The extent of mercury penetration 36 will, of course, produce a corresponding descent 38 in the piston surface 32, and although this surface movement is masked by the housing 24, the movement of the upper or visible piston surface 40 will indicate the same distance 38 and thus provide a measurement of the mercury which has been intruded into the test sample 28 at the applied pressure. This information, of course, provides a plot point for the pressure-volume curves of FIG. 4.

It has been found, however, that it is difficult to arrange measuring and sensing devices to supervise the movement of the visible piston surface 40 and this, as well as other aspects of known prior art apparatus as exemplified by apparatus 18, complicates practicing the technique of mercury intrusion as a means of measuring surfaces.

To overcome the foregoing and other shortcomings of the prior art, it is accordingly proposed according to the present invention to utilize the apparatus which is diagramatically illustrated in FiGS. 2, 3, and generally designated 42 in FIG. 2. Apparatus 42 includes a rotatably mounted hollow member 44 which has a central opening 46 which functions as a flow passage for a volume of mercury 48 which serves as the intruding fluid. The flow passage means 44 is rotatably mounted about a vertical axis 50 by being, in turn, appropriately mounted in its horizontally or laterally extending condition as illustrated in FIG. 2 on a rotating shaft 52 of a variable speed motor 54. At the proximal end of the member 44, i.e., the end located at the axis 50, member 44 is provided with a cylindrical wall 56, which in the illustrated embodiment will be understood to be transparent. Wall 56 effectively bounds a cylindrical storage compartment 58 of a comparatively small cross sectional extent for a supply volume 60 of the mercury 48. At the opposite or distal end of the member 44, there are walls 62 which cooperate to bound a storage compartment 64 for the test sample 66. As illustrated, the mercury 48 is physical or penetrating relation to the surface 68 of the sample 66 so that there will be intruding flow into the pores and void spaces of the sample 66 as the function of the pressure applied against the mercury 48.

The aforesaid pressure which promotes intrusion of the mercury 48 is developed as a function of the speed of rotation of the member 44. Thus, a suitable speed control device 70 is operatively connected to control the speed of rotation of the motor 54. As a consequence, and operating in a manner which is well understood, the selection of the speed of rotation of member 44 determines the centrifugal force developed at the distal end 62 and thus the amount of pressure being exerted by the mercury 48 on the test surface 68. That is, speed selection of the motor 54 is tantamount to selection of the applied pressure, and it is contemplated that this will be indicated by an appropriate pressure indicator 72.

An important aspect of the present invention is the location at the proximal end 60 of the member 44 of an appropriate sensing device 74 which, in a preferred embodiment, would occupy a position adjacent the supply compartment 58 and thus in a position from which it can effectively monitor or supervise any changes in the volume of the mercury supply 60, i.e. changes in the position of the mercury surface 76. The sensing device 74 may include a photoelectric cell or other such component that is capable of generating a varying voltage in accordance with the movement of the mercury surface 74. One such sensing device is described in U.S. Pat. No. 3,623,365. For present purposes, it suffices to understand that the signal output of the sensing device 74 will be appropriately transmitted via a connection 78 to an appropriate visual display 80 having a stylus or the like which is operated by and records the output signals of the sensing device 74.

The improved arrangement of the apparatus 42 also contemplates an operative connection 82 between the pressure indicator 72 and the display 80 so that the output signal from the indicator 72, in the form of generated voltage or the like, is effective in influencing the information displayed by the display 80. Thus, operating in a well understood manner, the display 80 is effective in recording, in response to the pressure and volume change information which is fed into it, a pressure-volume curve 84 which is similar in character to the curves 10, 12, 14 and 16 previously discussed, but for the test sample 66.

Reference should now be made to FIG. 3 in which the highlights of the operation of the improved apparatus 42 are best illustrated. Specifically, it should be readily appreciated that, since the pressure of the mercury 48 applied at the surface 68 is developed by centrifugal force, i.e. rotation of the member 44, the supply end 56 of member 44 exists virtually only under ordinary ambient pressure conditions. Thus, it is readily possible to fabricate the wall 56 of glass, transparent plastic or other such material which, in turn, readily enables visual supervision of the movement of the mercury surface 76. Additionally, the comparatively small radius cross section of the compartment 58 is effective in causing the manifestation of large movements in the surface 76 for a given extent of mercury intrusion into the test sample 66. The comparatively large surface movement 86 as compared with the smaller extent of intrusion 88 exemplifies this magnification.

Still referring to FIG. 3, it will be noted that the sample storage chamber 64 is formed with a 180 degree reverse orientation in the distal end of member 44. This configuration prevents the lighter powder sample 66 from being forced by the heavier mercury 48 out of an end position in the member 44 during the spinning of the member 44 and the development of centrifugal force. Stated another way, the centrifugal force 90 which is developed by the spinning of the member 44 maintains the powder sample 66, which is less in density than mercury, in position against the wall 92 during the time that it is subjected to mercury intrusion while within the chamber 64. Also, it is preferred to achieve the just noted reverse orientation using an upstanding neck 94, rather than mounting the chamber 64 in a depending relation from the member 44, since the elevation provided by the neck 94 serves to neutralize the pressure which is exerted on the powder sample 66 due solely to the height of the mercury supply column 60.

From the foregoing, it should be readily appreciated that the improved apparatus 42 effectively uses centrifugal force to cause mercury intrusion into void spaced and pores in a porous surface incident to determining and/or measuring the surface characteristics of such surface and that, among other noteworthy results, this contributes to a facilitated manner of extracting the information from which the surface determination and measurements are made. In sharp contrast to prior art apparatus, the mercury level which rises or falls as a function of the intruded volume is readily supervised since it exists in a low pressure environment and thus can be contained in a fragile, but transparent construction material. The selection of applied pressures is also facilitated when using the apparatus 42, since this parameter is related to speed of rotation and is thus readily achieved and continuously varied using any one of a wide variety of speed control and electric motor combinations.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An apparatus for intruding measured quantities of a fluid at selected pressures into penetrating relation with a porous test surface comprising a rotatably mounted conduit means defining a flow passage for said intruding fluid terminating in opposite proximal and distal operative ends, wall means at said distal end in communication with said flow passage defining a storage chamber for said test surface, transparent wall means at said proximal end in communication with said flow passage bounding a storage compartment for said intruding fluid, sensing means operatively arranged at said proximal end adapted to maintain visual supervision of said intruding fluid in said transparent storage compartment so as to indicate any volume changes therein, said fluid storage compartment being of a comparatively small cross-sectional area so as to manifest any fluid volume change therein as a comparatively large movement of the level of said fluid along the longitudinal axis of said compartment, speed-control means operatively arranged to provide rotation of said conduit means at known selected speeds causing intruding flow of said fluid through said flow passage into said test surface, whereby said intruding flow produces corresponding volume changes in said fluid that are measured by said sensing means, a display means for displaying said measured quantities of intruded fluid and said selected pressures corresponding to said rotational speeds of said conduit means, and means connected from said speed-control means and from said sensing means to operate said display means.

* * * * *